United States Patent
Kai

(10) Patent No.: US 7,756,158 B2
(45) Date of Patent: Jul. 13, 2010

(54) RADIO INTEGRATED CIRCUIT AND RADIO COMMUNICATION METHOD

(75) Inventor: Atsuhiro Kai, Miyazaki (JP)

(73) Assignee: Oki Semiconductor Co., Ltd. (JP)

( * ) Notice: Subject to any disclaimer, the term of this patent is extended or adjusted under 35 U.S.C. 154(b) by 1246 days.

(21) Appl. No.: 11/299,778

(22) Filed: Dec. 13, 2005

(65) Prior Publication Data

US 2006/0187961 A1  Aug. 24, 2006

(30) Foreign Application Priority Data

Feb. 24, 2005  (JP) .............................. 2005-049451

(51) Int. Cl.
*H04J 3/22* (2006.01)

(52) U.S. Cl. ...................... 370/469; 370/352

(58) Field of Classification Search ......... 370/200–253, 370/272–390, 431–546
See application file for complete search history.

(56) References Cited

U.S. PATENT DOCUMENTS

| | | | | |
|---|---|---|---|---|
| 3,940,764 | A * | 2/1976 | Beeswing | 342/47 |
| 6,002,708 | A * | 12/1999 | Fleming et al. | 375/130 |
| 6,570,858 | B1 * | 5/2003 | Emmons et al. | 370/321 |
| 6,574,266 | B1 * | 6/2003 | Haartsen | 375/133 |
| 6,671,282 | B1 * | 12/2003 | Haapalehto et al. | 370/401 |
| 6,735,183 | B2 * | 5/2004 | O'Toole et al. | 370/311 |
| 6,879,567 | B2 * | 4/2005 | Callaway et al. | 370/311 |
| 2001/0001611 | A1 * | 5/2001 | Yuzawa | 370/475 |
| 2003/0060185 | A1 * | 3/2003 | Fisher et al. | 455/344 |
| 2004/0001474 | A1 * | 1/2004 | Simelius et al. | 370/349 |
| 2004/0087291 | A1 * | 5/2004 | Wada | 455/216 |
| 2004/0240422 | A1 * | 12/2004 | Kim | 370/348 |
| 2004/0246983 | A1 * | 12/2004 | Kaatz | 370/432 |

FOREIGN PATENT DOCUMENTS

JP  2002-271436  9/2002

OTHER PUBLICATIONS

Non-patent exemplary technical document; Oct. 2004, vol. 71, No. 4, pp. 24-29 and 70-73.
(Translation) Oct. 2004, No. 200, vol. 71, No. 4, Oki Technical Review, 12 pages, "Development of Ubiquitous Sensor Network", Shigeru Fukunaga et al.
(Translation) Oct. 2004, No. 200, vol. 71, No. 4, Oki Technical Review, 9 pages, "ZigBee™ LSI that Realizes Next-Generation Local Area Wireless Network", Takeshi Ichikawa et al.

* cited by examiner

*Primary Examiner*—Ricky Ngo
*Assistant Examiner*—Iqbal Zaidi
(74) *Attorney, Agent, or Firm*—Studebaker & Brackett PC; Donald R. Studebaker

(57) ABSTRACT

A PHY-equipped radio LSI and a radio communication method capable of transmitting data without fail while maintaining a beacon interval. Using a selector which is switched by a beacon transmission signal output from a beacon register, a data transmission request signal is switched for transmitting data from a RAM to a PHY part, and a transfer is started when this signal goes to "1." In this way, for transmitting beacon data, the beacon data has been previously transferred to the RAM, and the beacon data is transmitted at the time of beacon transmission interval with the PHY part remaining in a transmission state, so that the beacon interval can be maintained. In addition, it is possible to prevent a failure in the transmission of transfer data due to the state of the PHY part.

4 Claims, 10 Drawing Sheets

COMMUNICATION LAYER MODEL OF ZigBee

SUPER-FRAME STRUCTURE

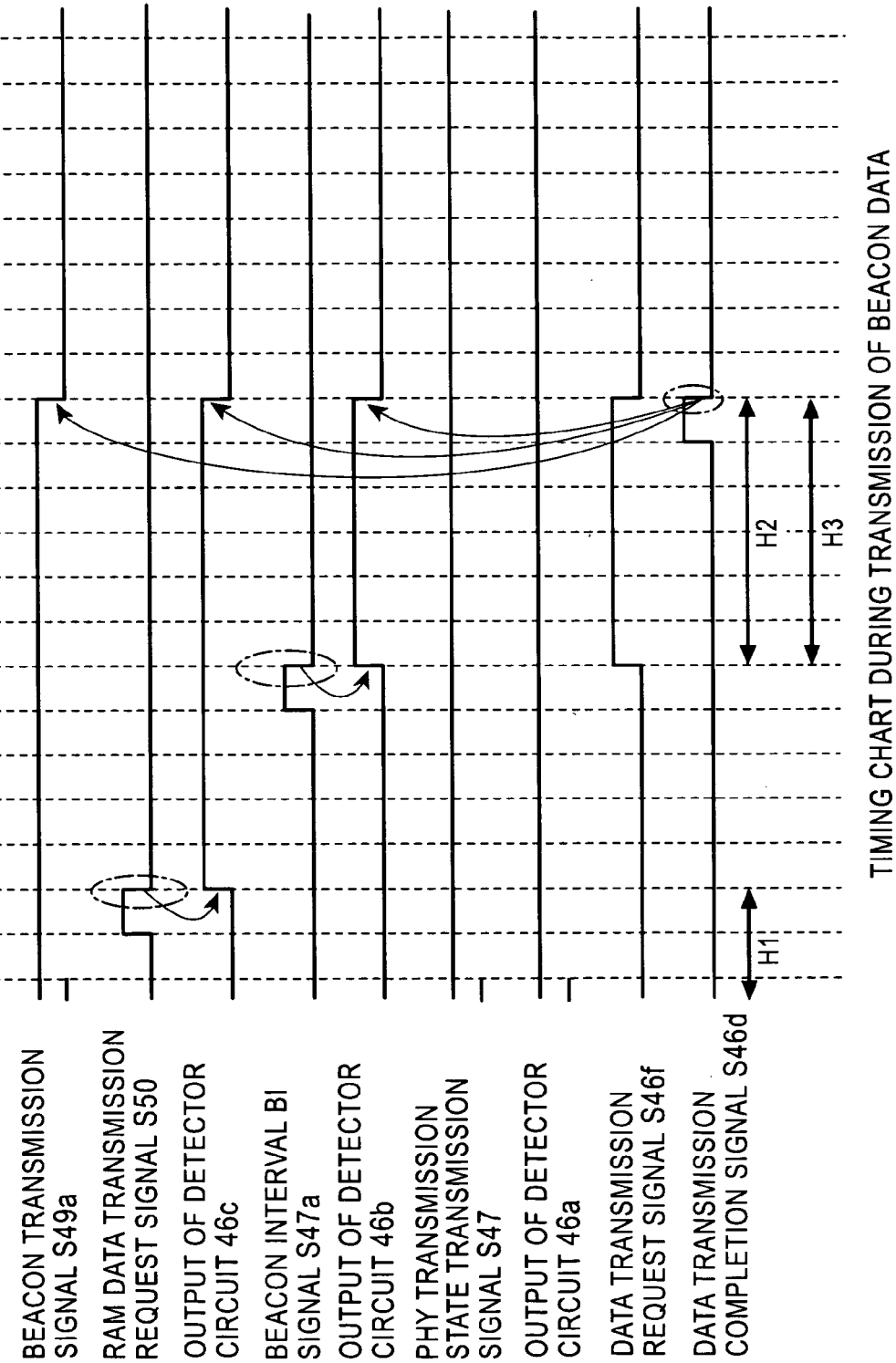

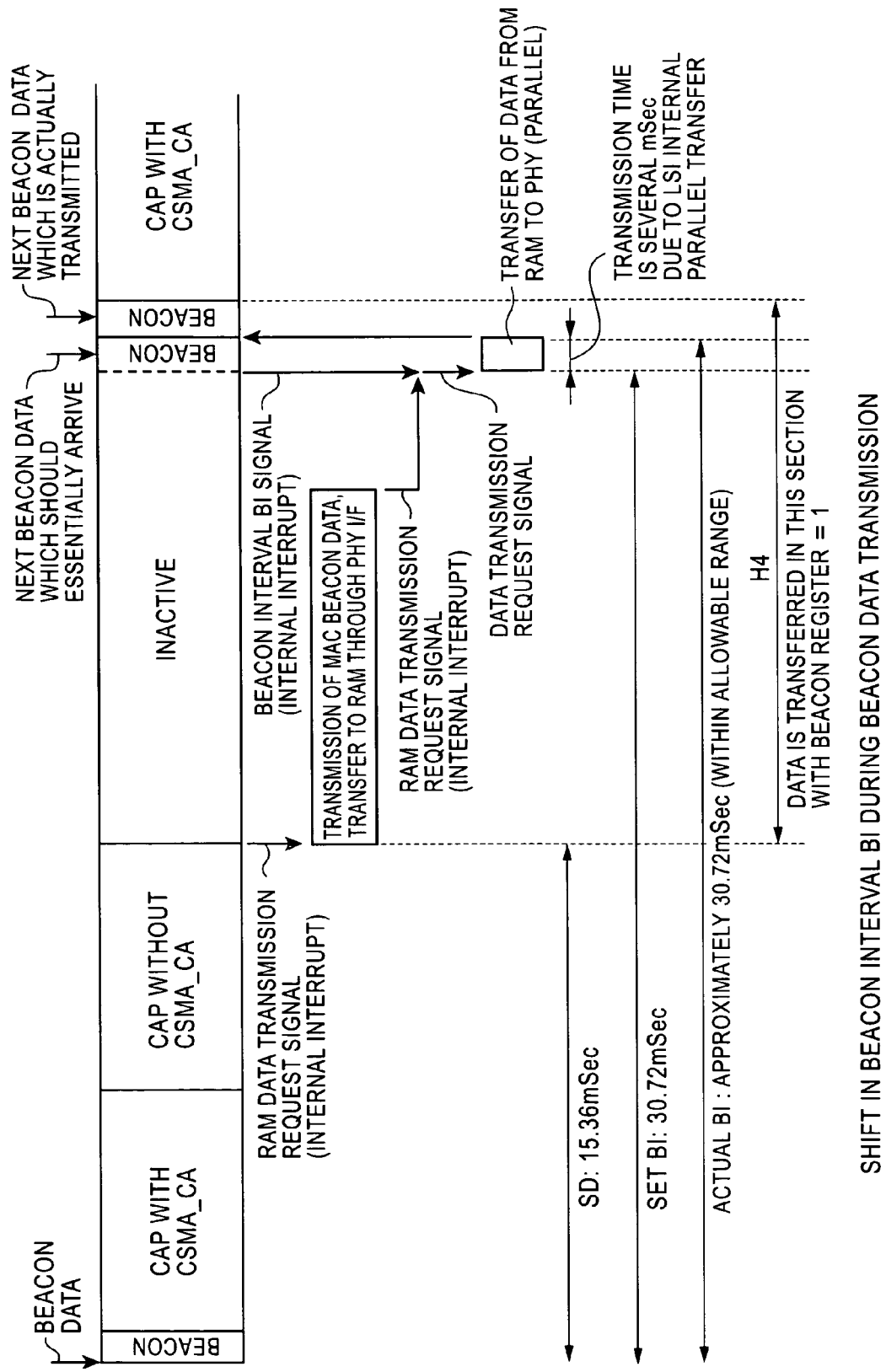

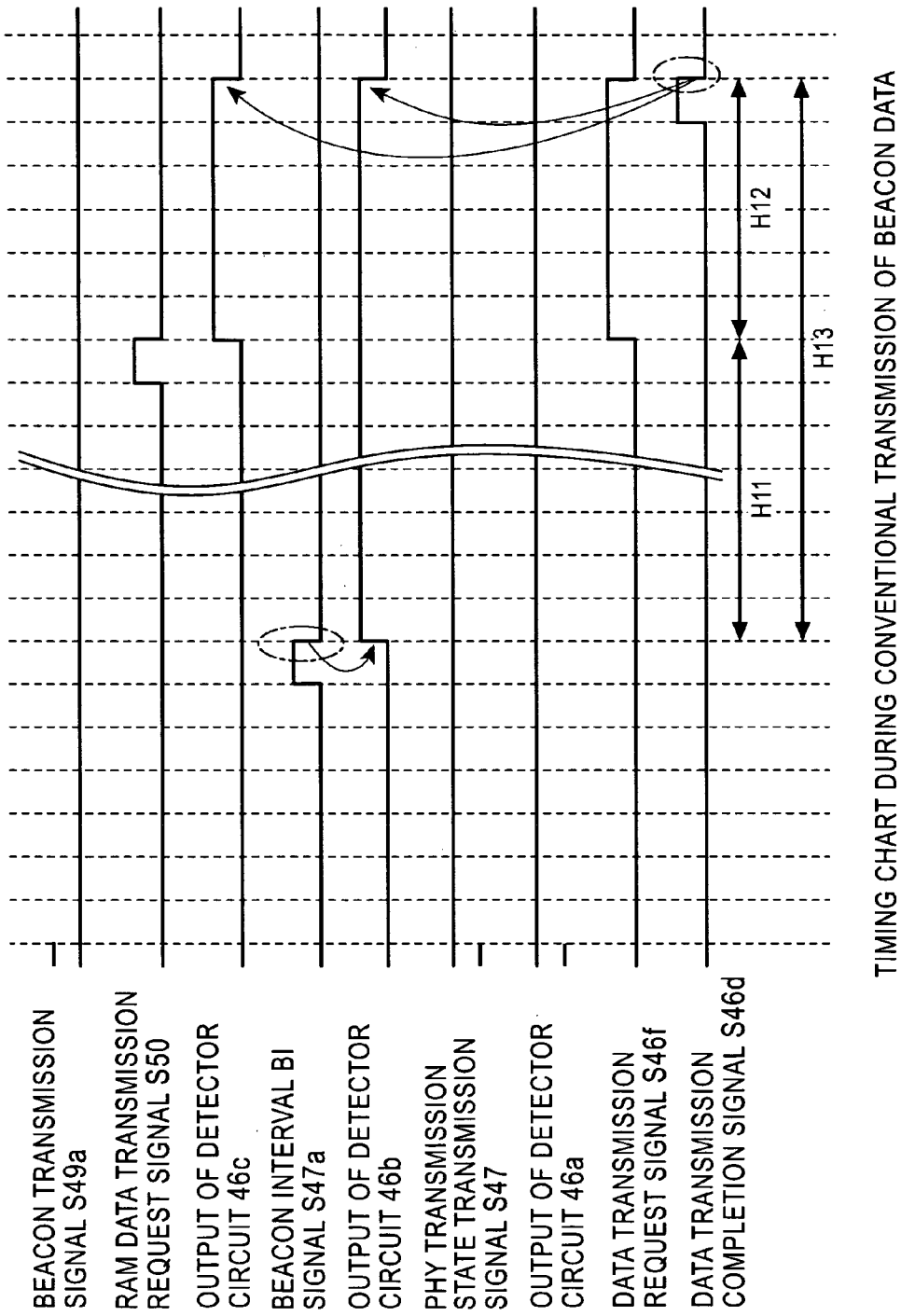

RADIO INTEGRATED CIRCUIT AND RADIO COMMUNICATION METHOD

BACKGROUND OF THE INVENTION

1. Field of the Invention

The present invention relates to a large-scale radio integrated circuit (hereinafter called the "radio LSI") which includes an interface (hereinafter called the "I/F"), conforming to IEEE (the Institute of Electric and Electronic Engineers) 802.15.4, with a physical layer (hereinafter called the "PHY") and a data link layer including a media access control layer (hereinafter called the "MAC") higher than the physical layer, and employs ZigBee (a trademark of ZigBee Alliance), which is one of near field radio communication standards included in radio communication standards, which divides a 2.4-GHz frequency band, the same as a radio LAN (Local Area Network) standard IEEE 802.11b, into 16 channels for utilization, and to a radio communication method, particularly, a transmission data control therefor.

2. Description of the Related Art

Conventional radio LSI's employing ZigBee and radio communication methods have been described, for example, in the following documents:

Oki Technical Review, Oki Electric Industry Co., 2004, Oct. 1, Vol. 71, No. 4, p. 24-29, 70-73 (Non-Patent Document 1); and Japanese Patent No. 3513596 (FIG. 1) (Patent Document 1)

FIG. 1 is a communication layer model diagram showing the protocol configuration of ZigBee used in the near field radio communications described in Non-Patent Document 1 and Patent Document 1.

The protocol configuration of ZigBee employs a PHY 1 of IEEE 802.15.4 which is an international standard of WL-PAN (Wireless Personal Area Network), and a data link layer which includes a MAC 2 and a logical link control layer (hereinafter called the "LLC"), and a network layer 3 and an application I/F layer 4, higher than the layers 1, 2, are standardized in accordance with ZigBee. The application I/F layer 4 is overlaid by an application layer 5 which can be arbitrarily defined by a customer.

The PHY 1 has a data transmission/reception function such as received power measurements, link quality notification, CSMA-CA (Carrier Sense Multiple Access with Collision Avoidance) for confirming a use situation of a channel, and the like so that received power can be measured for each channel during the construction of a network to find out a channel which is less affected by interfering power from other systems. Another mechanism has also been provided for changing to another communication channel when the quality of a used channel has deteriorated. The specifications of the PHY 1 define, for example, that the frequency is 2.4 GHz; the number of channels is 16, the modulation scheme is 0-QPSK (Quadrature Phase Shift Keying); the spreading scheme is DSSS (Direct Spread Spectrum); the data rate is 250 kbit/s; and an available area is all over the world. The data link layer has the MAC 2 which is a data format processing layer, and the LLC. The network layer 3 is a layer for managing data transfers between two nodes connected on a network.

The MAC 2 defines a beacon (BEACON) mode for performing intermittent operations and bandwidth guaranteed communications, and a non-beacon mode for making direct communications mutually among all nodes. The beacon mode is used in a star network which is centered at a network management node called the "PAN (Personal Area Network) coordinator." The PAN coordinator periodically transmits a beacon signal, while other nodes make communications within durations assigned thereto in synchronism with the beacon signal. One node assigned by the coordinator can solely occupy a channel to make communications without collisions, and is utilized for communications for which a low latency is required. On the other hand, the non-beacon mode is a mode for accessing channels at all times in accordance with CSMA-CA. When the non-beacon mode is used in a mesh link which directly communicates with peripheral nodes, each node can directly make a communication at all times, but must be waiting for reception such that it can receive data destined thereto at all times, so that the power cannot be saved by intermittent operations as in the beacon mode.

FIG. 2 is a diagram showing a flow when ZigBee data is transmitted/received between two communication devices.

For example, when ZigBee data is transmitted/received between two communication devices 10-1, 10-2 at a radio frequency (RF) of 2.4 GHz, each communication device 10-1, 10-2 comprises a radio transmission/reception part (hereinafter called the "RF part") 11; a modem part (MODEM) 12 for making modulation and demodulation; a PHY part 13; a PHY I/F part 14; a MAC part 15; a MAC I/F part 16; a network layer part (NETWORK) 17; an application I/F part (APPLICATION I/F) 18; an application layer part (APPLICATION) 19; and the like.

The RF part 11 is a transceiver which makes transmission/reception through an antenna at RF 2.4 GHz defined by the PHY 1 of IEEE 802.15.4. The modem part 12 modulates or demodulates data communicated with the PHY part 13 in accordance with modulation/demodulation circuit regulations defined in the PHY 1 of IEEE 802.15.4. The PHY part 13 outputs IQ data to the modem part 12 during transmission, and acquires demodulated data during reception in accordance with a data format defined in the PHY 1 of IEEE 802.15.4. The PHY I/F part 14 transmits/receives data between the PHY part 13 and MAC part 15 using a serial I/F such as a synchronous communication I/F (hereinafter called the "SCI").

The MAC part 15 handles all MAC commands in the MAC 2 of IEEE 802.15.4. Transmission data is transferred from the MAC part 15 to the PHY part 13, modulated by the modem part 12, and transmitted from the RF part 11 and antenna. Reception data received by the antenna and RF part 11 is demodulated by the modem part 12, analyzed by the MAC part 15 through the PHY part 13 and PHY I/F part 14, and transferred to a higher rank device (network layer part 17). The MAC I/F part 16 transmits/receives data between the MAC part 15 and the network layer part 17 using a serial I/F such as SCI. The network layer part 17 transmits/receives data to/from a central processing part (hereinafter called the "CPU") in a host using a serial I/F.

Exemplary circuit configurations for developing radio LSI's conforming to IEEE 802.15.4 and in accordance with the stipulations of ZigBee include a radio LSI 10A which is equipped with a MAC and a radio LSI 10B which is equipped with a PHY in consideration of a network configuration for each user (CUSTOMER). The MAC-equipped radio LSI 10A is a circuit that includes the RF part 11, modem part 12, PHY part 13, PHY I/F part 14, and MAC part 15, as well as the MAC I/F part 16 with a higher rank layer defined by ZigBee, and has the advantage of simplifying data transmission/reception to/from the host CPU on the higher rank layer. On the other hand, the PHY-equipped radio LSI 10B is a circuit that includes the RF part 11, modem part 12, PHY part 13, and PHY I/F part 14 conforming to IEEE 802.15.4. When the user has developed even a unique MAC, the employment of the PHY-equipped radio LSI 10B increases the degree of freedom because it can be equipped with a MAC desired by the user.

One feature of the MAC part 15 of IEEE 802.15.4 shown in FIG. 2 is the employment of a super-frame structure using a beacon. An example of this super-frame structure is shown in FIG. 3.

The super-frame structure is divided into a CAP (Contention Access Period) in which all devices can access a beacon interval; CFP (Contention Free Period) which is occupied by a particular device for accessing; and an inactive period in which all devices are prohibited from accessing. Also, the CFP is divided equally into seven by a GTS (Guaranty Time Slot) mechanism, and can be assigned to a device which wishes to preferentially make a communication. FIG. 3 shows an assignment when three time sections are assigned to GTS1 and GTS2, respectively, from seven time sections equally divided by the GTS mechanism. The devices which have been assigned this period can preferentially transmit/receive data. The beacon interval BI is set to be equal to or longer than a super-frame duration (BD).

After the beacon interval has been set using this super-frame structure, data will be transmitted/received while maintaining the same interval at all times. Therefore, IEEE 802.15.4 includes stipulations related on the beacon transmission interval (beacon interval) BI which must be observed. For this purpose, a timer is often provided within the radio LSI, and is started upon transmission of a beacon for comparing a beacon interval set value stored in an internal register with the internal timer. An interrupt is generated at a coincident time (the timer becomes equal to the beacon interval BI), such that the interrupt triggers the transmission of the beacon to maintain the interval.

FIG. 4 is a functional block diagram showing an exemplary circuit configuration of a conventional radio LSI 10B, which is equipped with the PHY, described in Non-Patent Document 1.

The PHY-equipped radio LSI 10B is a chip for serially communicating signals with a host 30 through SCI or the like, and has an RF part 11 connected to an antenna 21. The RF part 11 is connected to a modem part 12 through a serial transfer signal line, and the modem part 12 is connected to a PHY part 13 through a serial transfer signal line. The radio LSI 10B is also provided with a random access memory (hereinafter called the "RAM") 22 for storing transmission data and the like; a bus 23 for parallelly transferring signals; a security part 24; a register, not shown; and the like. The RAM 22 is connected to the PHY part 13, security part 24, and PHY I/F part 14 through the parallel transfer bus 23, the PHY part 13 and security part 24 are interconnected through a parallel transfer signal line, and the PHY part 13 and PHY I/F part 14 are interconnected through a parallel transfer signal line.

The security part 24 has a security function which uses AES (Advanced Encryption Standard) defined by IEEE 802.15.4 to encrypt and decrypt data. The register, not shown, is a circuit for switching among circuit components to which data is transferred, for adjusting different data transmission/reception timings of the respective circuit components, i.e., the RAM 22, security part 24, and PHY part 13, for storing parameters required for the AES processing, and the like.

The host 30, installed outside, comprises a MAC part 15, a CPU 31 for executing a network layer 3, an application layer 5 and the like in software, and the like, and D/A converts internal digital signals (D) to analog signals (A) which are output from the host 30, D/A converts analog signals (A) from the outside to digital signals (D) which are captured into the host 30, and performs a variety of input/output (hereinafter called "I/O") operations and the like.

Next, a radio communication method in the radio LSI 10B shown in FIG. 4 will be described.

The security part 24 is used when transmission data coming from the external MAC part 15 is encrypted and transmitted from the antenna 21, or when encrypted reception data from the antenna 21 is decrypted. If data is not encrypted or decrypted when it is transmitted or received, serial transmission data from the MAC part 15 in the host 30 is received by the PHY I/F part 14 during transmission, and parallelly transferred and stored in the RAM 22 through the bus 23. Since no MAC part is equipped inside, a parallel transfer is started from the RAM 22 to the PHY part 13 at the time the transmission data has been completely stored in the RAM 22, such that the transmission data is serially transferred from the PHY part 13 to the RF part 11 through the modem part 12, and transmitted from the antenna 21.

During reception, reception data received by the antenna 21 and RF part 11 is serially transferred, demodulated by the modem part 12, and serially transferred to the PHY part 13. The serially transferred reception data is parallelly transferred from the PHY part 13 to the bus 23, and stored in the RAM 22. The reception data read from the RAM 22 is parallelly transferred to the PHY I/F part 14 through the bus 23, and serially transferred from the PHY I/F part 14 to the host 30.

When data is encrypted and decrypted during data transmission and reception, a transmission follows a signal path which involves transmission data from the MAC part 31 in the host 30 (serial transfer)->PHY I/F part 14 (parallel transfer) =>bus 23 (parallel transfer)=>storage in the RAM 22=>bus 23 (parallel transfer)=>encryption by the security part 24 (parallel transfer)=>PHY part 13 (serial transfer)->modulation by the modem part 12 (serial transfer)->RF part 11->transmission from the antenna 21.

During reception, data received by the antenna 21 follows a signal path which involves RF part 11 (serial transfer)->demodulation by the modem part 12 (serial transfer)->PHY part 13 (parallel transfer)=>decryption by the security part 24 (parallel transfer)=>bus 23 (parallel transfer)=>PHY I/F part (serial transfer)->host 30.

On the other hand, the conventional MAC-equipped radio LSI 10A is provided therein with the MAC part 15 in the host 30, and the MAC I/F part 16, instead of the PHY I/F part 14 in FIG. 4. Transmission data from a host 30', from which the MAC part 15 is deleted, is stored in the RAM 22 through the MAC I/F part 16 and bus 23 in the radio LSI 10A. After this determination on transfer is made by the MAC part 15 in the radio LSI 10A, transmission data is read from the RAM 22 and parallelly transferred to the PHY part 13.

SUMMARY OF THE INVENTION

However, the conventional PHY-equipped radio LSI 10B and radio communication method has the following problems.

The MAC I/F part 16 in the radio LSI 10A for use in communication of data with a higher rank layer (network layer part 17) of the host 30' in the MAC-equipped radio LSI 10A, and the PHY I/F part 14 in the radio LSI 10B for use in communication of data with a higher rank layer (MAC part 15) in the host 30 in the PHY-equipped radio LSI 10B often use the serial I/F such as SCI which takes long time for communicating data because data is serially transferred.

Since the MAC-equipped radio LSI 10A handles analysis and transfer of transmission and reception data in the MAC part 15 contained therein, the beacon interval BI is readily maintained in the beacon transmission using the super-frame structure by mounting the RAM 22 within the radio LSI 10A, storing data to be transferred in the RAM 22, recognizing the beacon interval BI by an interrupt generated by the internal timer, and parallelly transferring the data to the PHY part 13 using an internal high-speed clock of the radio LSI 110A.

However, in the PHY-equipped radio LSI 10B, the MAC part 15 in the external host 30 is relied on to analyze data and determine whether the data can be transferred. For this reason, if the external MAC part 15 recognizes a determined transfer of transmission data and transmits the transmission data to the PHY I/F part 14 in the radio LSI 10B, a problem arises in that the beacon interval BI cannot be maintained by the system configuration due to not only a time loss caused by PHY/IF (serial transfer) but also a dependence on the clock frequency for serial transfer.

It is an object of the present invention to provide a PHY-equipped radio LSI and a radio communication method which are capable of solving the prior art problems as mentioned above and ensuring data transmission with a consistent beacon interval BI.

A radio integrated circuit of the present invention comprises a radio transmission/reception part for converting modulated data to radio waves and transmitting the radio waves during a transmission, and receiving the incoming radio waves to output reception data during a reception in accordance with a predetermined radio communication standard, a modulator/demodulator part for modulating converted data to the modulated data and outputting the modulated data to the radio transmission/reception part during the transmission, and demodulating the reception data and outputting demodulated data during the reception, a PHY part for outputting a transmission state transition signal and converting transfer data to the converted data in a predetermined format, and outputting the converted data to the modulator/demodulator part during the transmission, and capturing the demodulated data in a reception state, a time measuring part for outputting a beacon interval signal when a beacon interval expires, a storage part for storing the demodulated data captured by the PHY part, normal transmission data sent from a MAC part disposed outside, or beacon data sent from the MAC part, a PHY I/F part for transmitting/receiving data between the MAC part and the PHY part in synchronism with a serial transfer clock, transmitting the demodulated data stored in the storage part to the MAC part, and outputting a storage part data transmission request signal when the normal transmission data sent from the MAC part or the beacon data is received and stored in the storage part, and a transfer part for controlling a transfer of data between the PHY part and the storage part.

A beacon flag is provided which is set by the MAC part to a first logic when the normal transmission data is transmitted, and to a second logic when the beacon data is transmitted. The transfer part comprises a selector for selecting the storage part data transfer request signal when the beacon flag is at the first logic to transfer the normal transmission data stored in the storage part to the PHY part, and selecting the result of a logical AND of the transmission state transition signal, the beacon interval signal, and the storage part data transmission request signal when the beacon flag is at the second logic to transfer the beacon data stored in the storage part to the PHY part.

Also, a radio communication method of the present invention is a method of making a radio communication using a data in a frame structure having a first data duration in which a device can be accessed, and a second data duration in which an access to the device is prohibited, wherein processing performed from the first data duration of current data is performed from the second data duration of data received previous to the current data.

Another radio communication method of the present invention is a method of making a radio communication using a data in a frame structure having a first data duration in which a device can be accessed, and a second data duration in which an access to the device is prohibited, wherein processing is started for another data received in succession from the second data duration.

The radio integrated circuit according to one feature of the present invention comprises the switching circuit for performing a switching operation in accordance with the beacon flag, so that when beacon data is transmitted, the beacon data has been previously stored in the storage part, and the beacon data is transmitted at the time of the beacon transmission interval with the PHY part remaining in a transmission state. In this way, the beacon interval can be maintained without fail with a reduced shift in the beacon interval. Moreover, it is possible to prevent a failure in transmitting transfer data due to the state of the PHY part, thus ensuring that the data transmission can be accomplished.

Since the radio integrated circuit according to another feature of the present invention comprises a clear circuit, the beacon flag is cleared at the time the beacon data has been completely transmitted, and the selecting part is switched to the output side of the third latch circuit. In this way, data can be subsequently transmitted in a normal state. The radio integrated circuit according to this feature of the present invention has similar advantages to the foregoing.

A PHY-equipped radio LSI of the present invention comprises an RF part for converting modulated data to radio waves and transmitting the radio waves during a transmission, and receiving the incoming radio waves to output reception data during a reception in accordance with a predetermined radio communication standard (for example, ZigBee), a modem part for modulating converted data to the modulated data and outputting the modulated data to the RF part during the transmission, and demodulating the reception data and outputting demodulated data during the reception, a PHY part for outputting a transmission state transition signal and converting transfer data to the converted data in a predetermined format, and outputting the converted data to the modem part during transmission, and capturing the demodulated data in a reception state, and a time measuring part (for example, a timer) for outputting a beacon interval signal when a beacon interval expires.

Further, the radio LSI comprises a storage part (for example, RAM) for storing the demodulated data captured by the PHY part, normal transmission data sent from a MAC part disposed outside, or beacon data sent from the MAC part, a PHY I/F part for transmitting/receiving data between the MAC part and the PHY part in synchronism with a serial transfer clock, transmitting the demodulated data stored in the storage part to the MAC part, and outputting a storage part data transmission request signal when the normal transmission data sent from the MAC part or the beacon data is received and stored in the storage part, a beacon flag which is set by the MAC part to a first logic when the normal transmission data is transmitted, and to a second logic when the beacon data is transmitted, and a transfer part (for example, a wrapper) for controlling a transfer of data between the PHY part and the storage part.

The wrapper comprises a selector circuit for selecting the storage part data transfer request signal when the beacon flag is at the first logic to transfer the normal transmission data stored in the storage part to the PHY part, and selecting the result of a logical AND of the transmission state transition signal, the beacon interval signal, and the storage part data transmission request signal to transfer the beacon data stored in the storage part to the PHY part.

BRIEF DESCRIPTION OF THE DRAWINGS

FIG. 6 is a timing chart showing a communication method during beacon data transmission in FIGS. 5A, 5B;

FIG. 7 is a diagram showing a shift in beacon interval BI during beacon data transmission in FIGS. 5A, 5B;

FIG. 8 is a timing chart showing a communication method during beacon data transmission when either a beacon register 49a or a selector 46f is not provided as is the case in the prior art.

DETAILED DESCRIPTION OF THE EMBODIMENTS

Configuration of First Embodiment

Figure 5A:
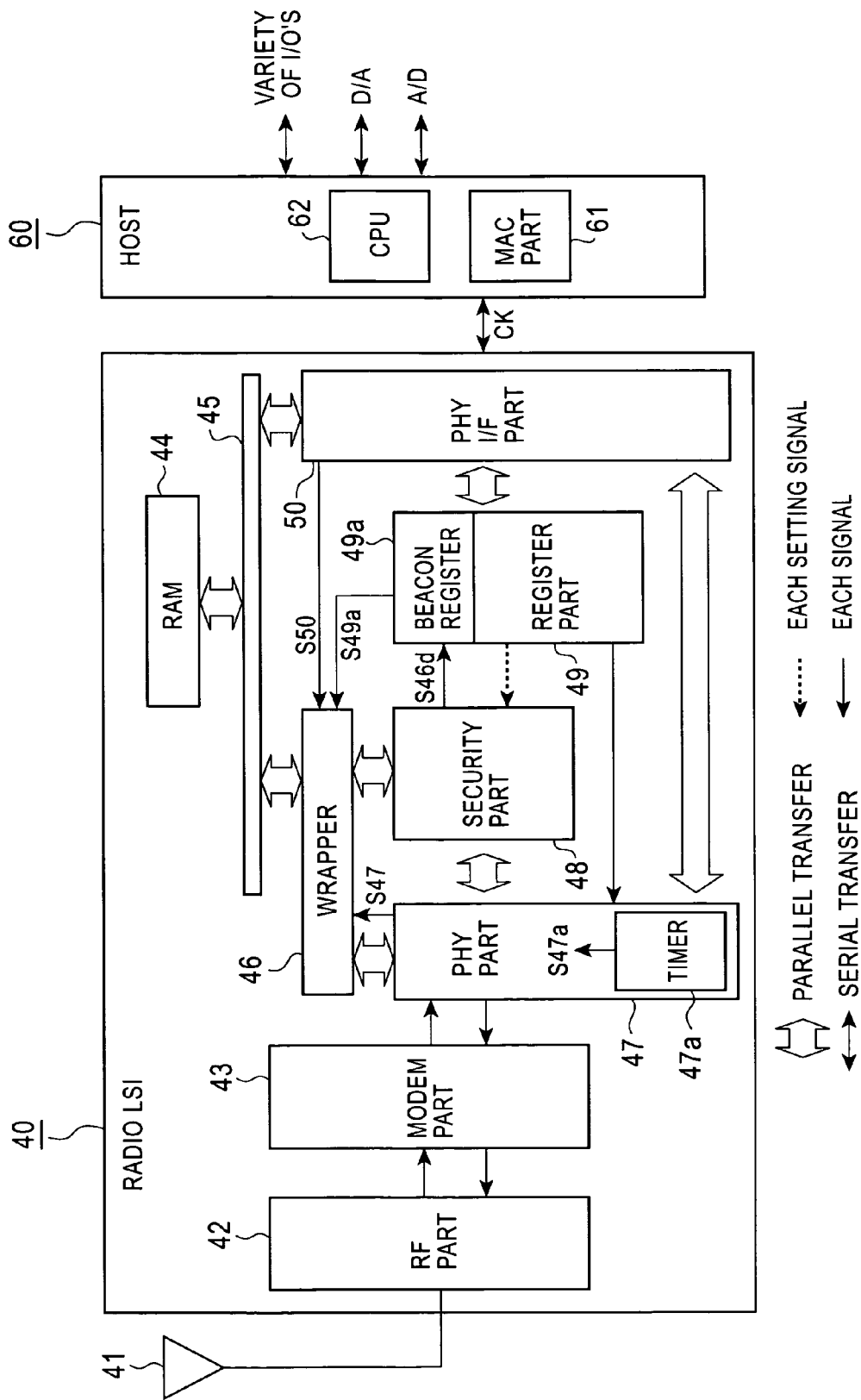
FIGS. 5A, 5B are diagrams generally showing the configuration of a PHY-equipped radio LSI according to a first embodiment of the present invention.
Figure 5B:
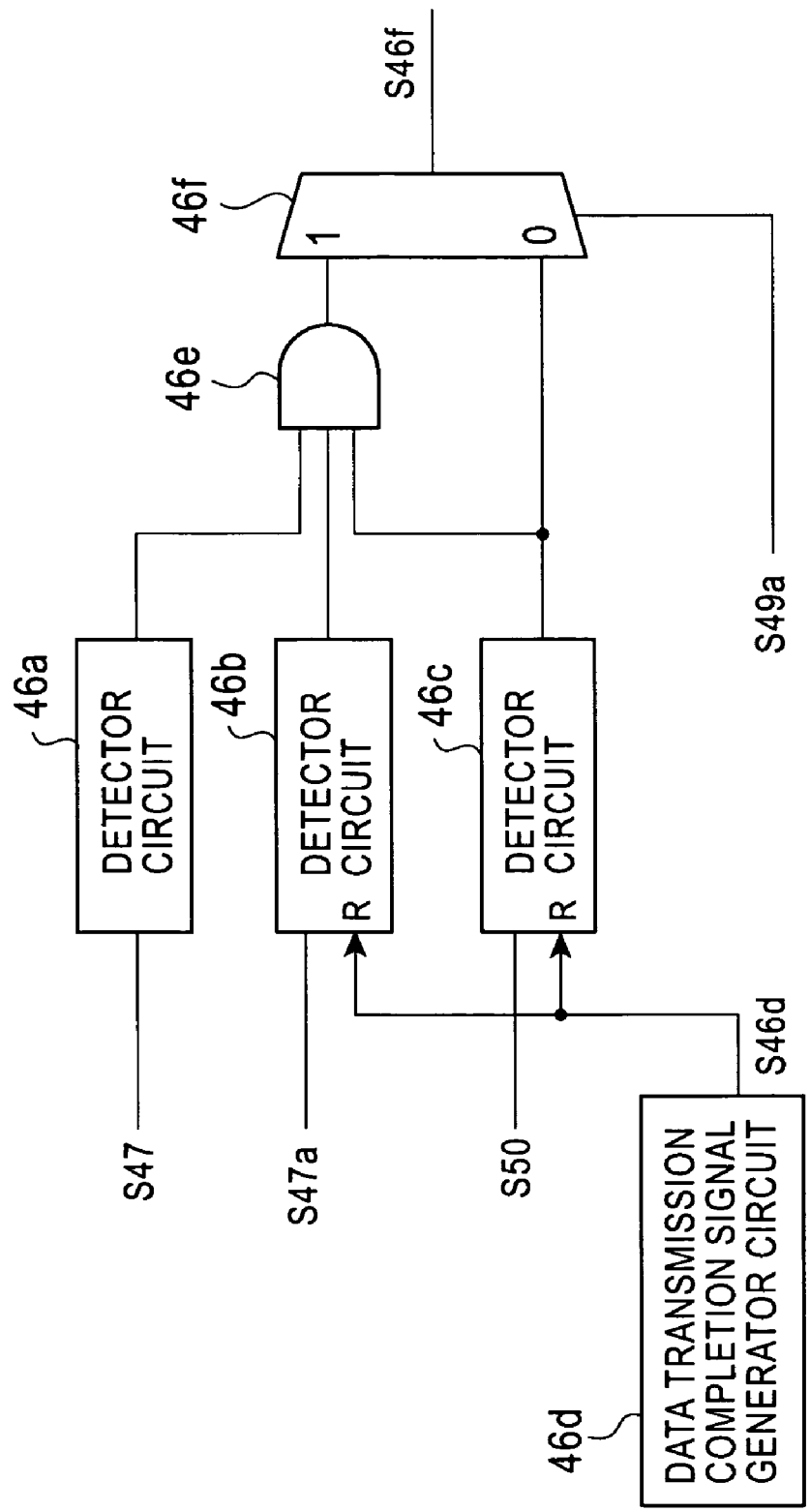

FIGS. 5A, 5B are diagrams generally showing the configuration of a PHY-equipped radio LSI according to a first embodiment of the present invention, where FIG. 5A is a general functional block diagram, and FIG. 5B is a diagram showing the configuration of a switching circuit provided in a wrapper in FIG. 5A.

The PHY-equipped radio LSI 40 shown in FIG. 5A is a chip for serially communicating signals with a host 60 through SCI or the like, and comprises an RF part 42 connected to an antenna 41. The RF part 42 is a transceiver comprising an analog radio circuit for performing transmission/reception through the antenna 41 at RF 2.5 GHz defined by the PHY 1 of IEEE 802.15.4, shown in FIG. 1. A modem part 43 is connected to the RF part 42 through a serial transfer signal line. The modem part 43 modulates or demodulates data with the PHY 1 in accordance with a modulation/demodulation circuit specifications defined by the PHY 1 of IEEE 802.15.4.

The radio LSI 40 is further provided with a storage part (for example, RAM) 44 for storing communication data and the like. This RAM 44 is connected to a signal transmission bus 45 through a parallel transfer signal line. A transfer part (for example, a wrapper) 46 is connected to the bus 45 through a parallel transfer signal line. The wrapper 46 is also connected to a PHY part 47 and a security part (AES) 48 through parallel transfer signal lines, and connected to a register part 49 through a serial transfer signal line. A PHY I/F part 50 is also connected to the bus 45 through a parallel transfer signal line.

The wrapper 46 has functions of switching data transfer paths in accordance with a value set in the register part 49, adjusting different data transmission/reception timings of the RAM 44, security part 48, and PHY part 47, and the like.

The PHY part 47 connected to the wrapper 46 is also connected to the security part 48 and PHY I/F part 50 through parallel transfer signal lines. The PHY part 47 has functions of temporarily saving transmission data in an internal buffer, and then converts the temporarily saved transmission data to IQ data (converted data) in accordance with a data format defined by the PHY 1 of IEEE 802.15.4, outputting the IQ data to the modem part 43, capturing reception data (demodulated data) from the modem part 43 for temporary storage in its internal buffer, outputting a PHY transmission state transition signal S47 which takes logical "1" or "0" representing a current state such as a transmission state, a reception state (RX_ON), a stop state (TRX_OFF), and an internal buffer full state, and the like. The internal buffer of the PHY part 47 temporarily holds transfer data, and when untransferred data is present therein (i.e., in the full state), newly incoming transfer data cannot be captured into the PHY part 47. The Buffer_full state arises when new data is transferred before data within the internal buffer has been completely transferred when a plurality of data are transmitted in succession in a data transmission (for example, when 127 bytes or more of data is divided and transmitted in succession). By indicating the Buffer_full state to the outside, the transfer of new data into the internal buffer is limited to prevent corruption of data in the internal buffer. The PHY part 47 contains a time measuring part (for example, a timer) 47a. The timer 47a outputs a pulsed beacon interval BI signal S47a through an internal interrupt or the like at the time the beacon interval BI expires. The timer 47a may be disposed external to the PHY part 47.

The security part 48, which is an optional function in a ZigBee LSI, has an AES-based security function (data encryption/decryption function) defined by IEEE 802.15.4 to encrypt transmission data and decrypt reception data. The security part 48 is configured to be switchable based on a value set in the register part 49 such that it encrypts/decrypts data or not when the data is transmitted/received. The security part 48 may not be provided because it is an optional function.

The register part 49 controls a transfer method and the like (for example, stores a set value for switching data transfer paths, an adjusting value for data transmission/reception timings different from one circuit component to another, parameters necessary for the AES processing, and the like), and has an internal beacon register 49a which is a beacon flag. The beacon register 49a is a register which outputs a beacon transmission signal S49a which is set, for example, to logical "0" by the host 60 when normal transmission data, sent from the host 60, is transmitted, and to "1" when beacon data (for example, a variable-length data having a maximum length of 127 bytes), sent from the host 60, is transmitted, and is cleared by a data transmission completion signal S46d.

Figure 2:
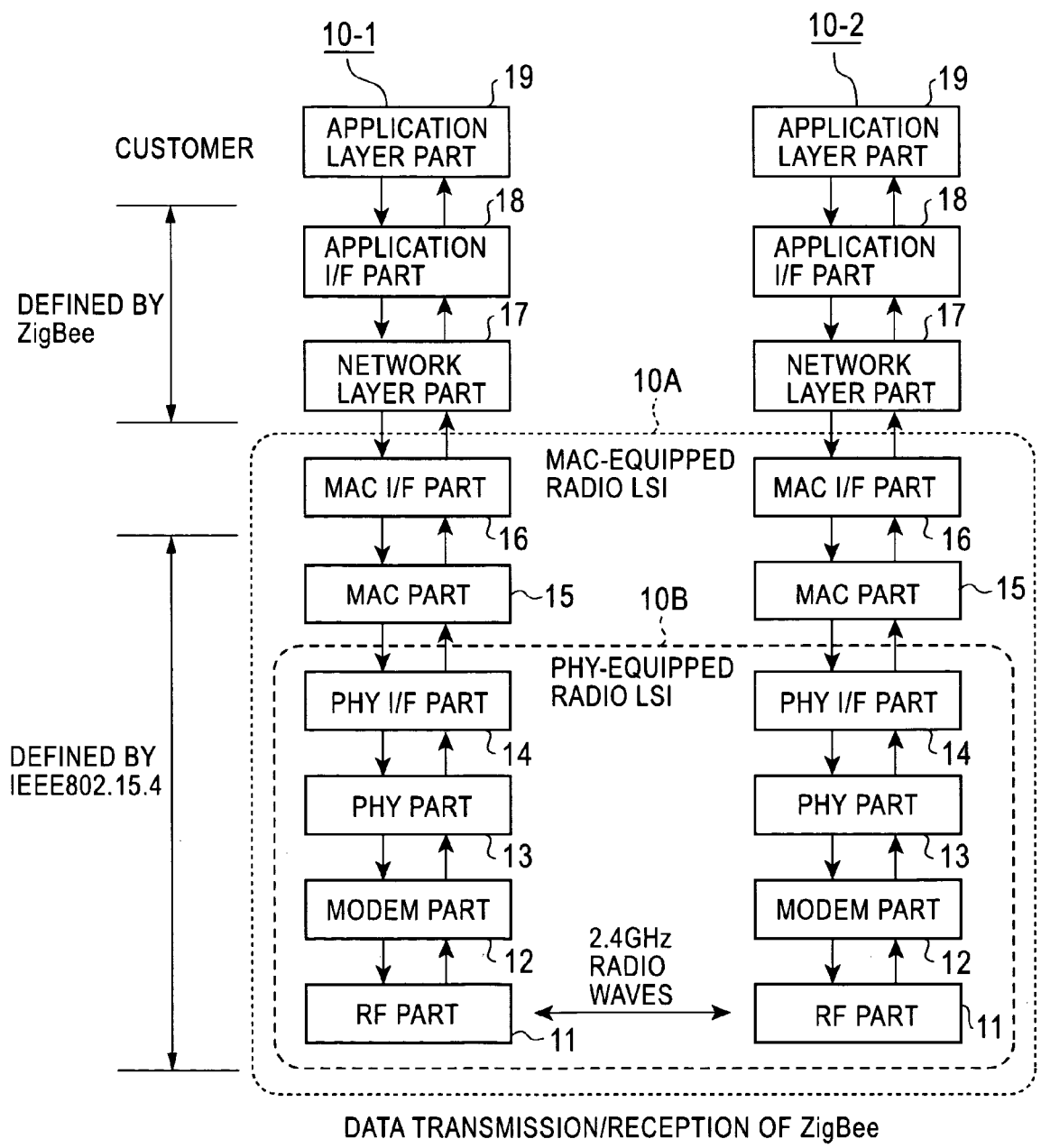
FIG. 2 is a diagram showing a flow when ZigBee-based data transmission/reception is performed between two communication devices.
Figure 3:
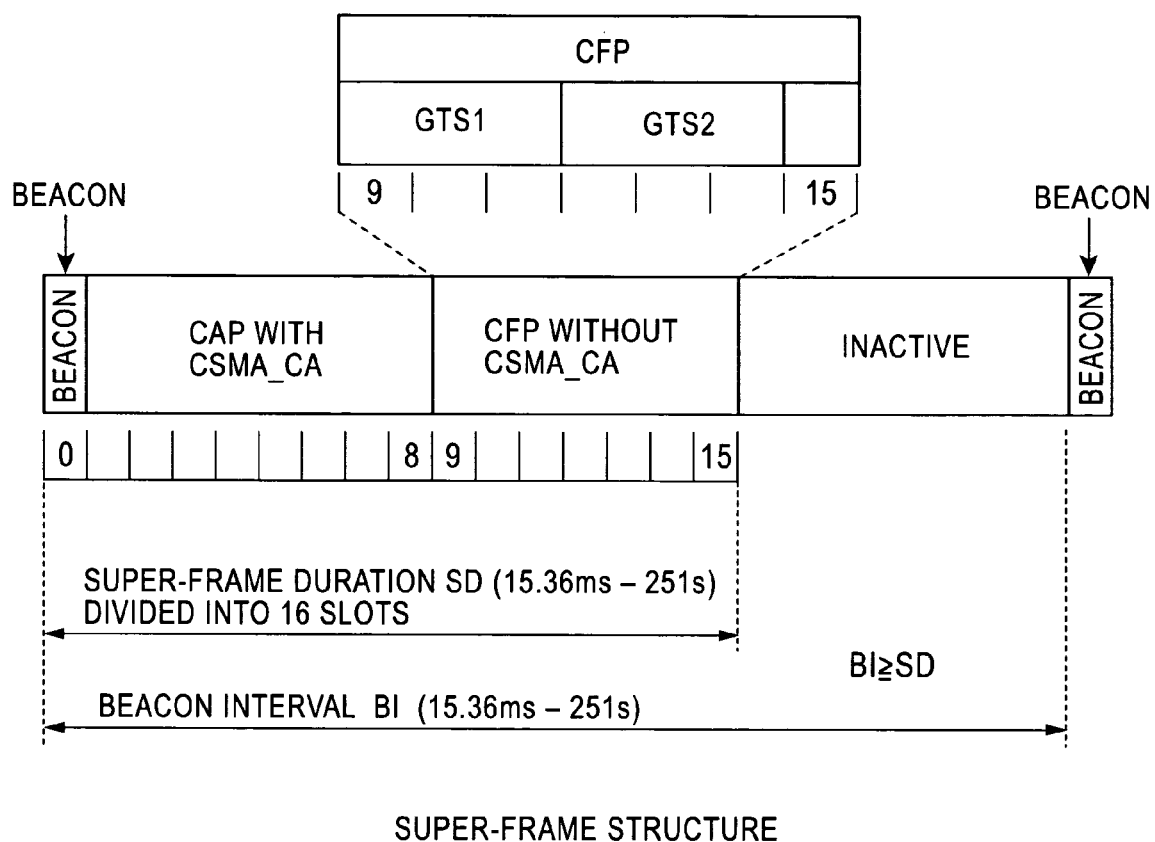
FIG. 3 is a diagram showing an example of the super-frame structure.

The PHY I/F part 50 transmits/receives data between the PHY 1 and MAC 2 shown in FIG. 2 using a serial I/F such as SCI, which is driven by a serial transfer clock CK, and outputs a pulsed RAM data transmission request signal S50 at the time transmission data from the host 60 has been stored in the RAM 44 through the bus 45.

Figure 1:
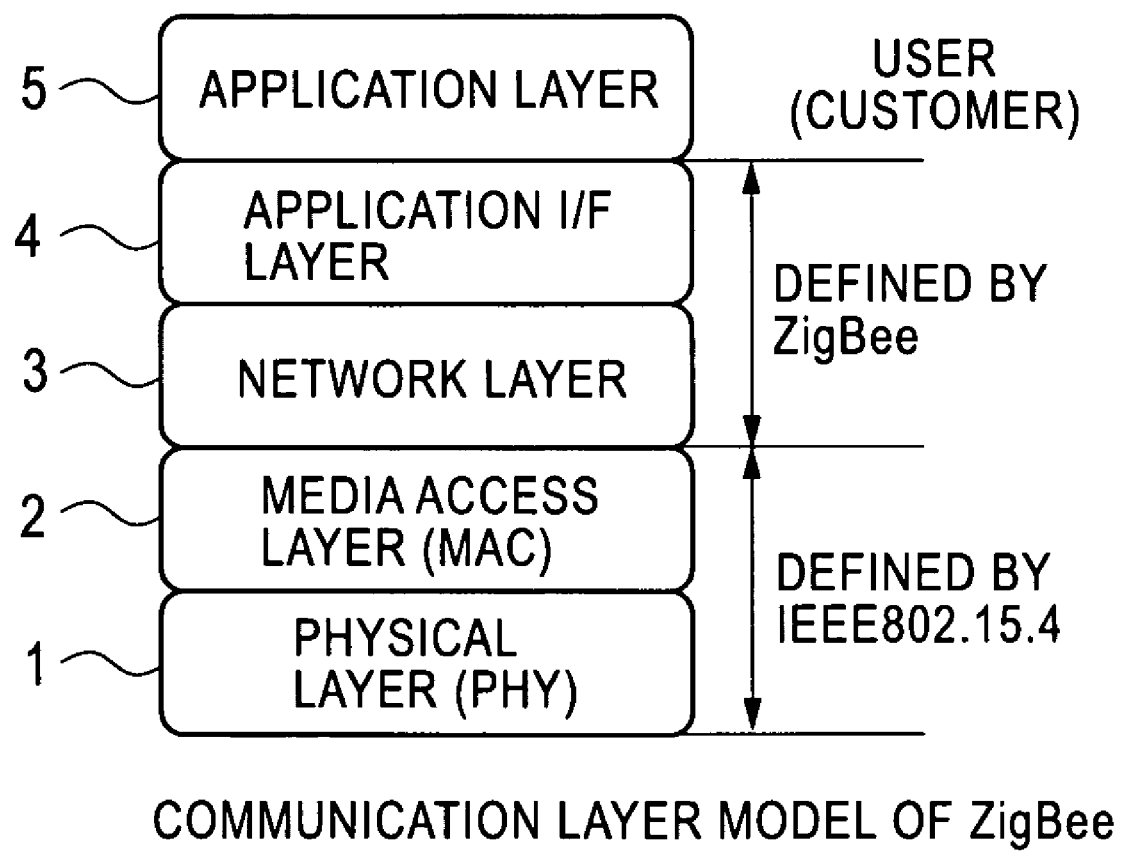
FIG. 1 is a communication layer model diagram showing the protocol configuration of ZigBee used in near field radio communications.

The host 60, installed outside, comprises a MAC part 61 for executing the MAC 1 shown in FIG. 1, an 8-bit CPU 62, for example, for executing the network layer 3, application layer 5 and the like in software, and the like. The host 60 D/A converts internal digital signals to analog signals which are output therefrom, D/A converts analog signals from the outside to digital signals which are captured therein, and performs a variety of I/O operations and the like.

The switching circuit shown in FIG. 5B, which is disposed in the wrapper 46, is a circuit for generating a data transmission request signal S46f from the RAM 44, used for maintaining the beacon interval BI, to the PHY part 47.

The register 49 is provided therein with the beacon register 49a which is used when one wishes to transmit beacon data from the host 60 for recognizing that data to be next transmitted is the beacon data. The switching circuit of FIG. 5B switches a method of generating the data transmission request signal S46f from the RAM 44 to the PHY part 47 between beacon data transmission and normal data transmission. When beacon data is transmitted, the data has been previously stored in the RAM 44, such that the data is transmitted at the time the beacon interval BI arrives, thereby maintaining the beacon transmission interval.

The switching circuit comprises a first latch circuit (for example, a detector circuit including a flip-flop (hereinafter called the "FF") or the like) 46a for detecting and holding the PHY transmission state transition signal S47 at "1" or "0" output from the PHY part 47; a second latch circuit (for example, a detector circuit including an FF or the like) 46b for detecting and holding the pulsed beacon interval BI signal S47a output from the timer 47a; a third latch circuit (for example, a detector circuit including an FF or the like) 46c for detecting and holding a pulsed RAM data transmission request signal S50 output from the PHY I/F part 50; and a clear circuit (for example, a data transmission completion signal generator circuit) 46d for generating a pulsed data transmission completion signal S46d which indicates that the wrapper 46 has completed a transfer of transmission data to the PHY part 47.

Each detector circuit 46b, 46c is provided with a reset terminal R, and is cleared by the data transmission completion signal S46d which is input to the reset terminal R. A logical circuit (for example, a three-input, one-output AND gate) 46e is connected to output terminals of the detector circuits 46a, 46b, 46c, and has an output terminal connected, for example, to a "1" side input terminal of a selecting part (for example, a two-input, one-output selector) 46f. The selector 46f has a "0" side input terminal connected to the output terminal of the detector circuit 46c. The selector 46f selects the "1" side input terminal when the beacon transmission signal S49a output from the beacon register 49a is, for example, "1," and selects an output signal of the AND gate 46e which is output as the data transmission request signal S46f. The selector 46f selects the "0" side input terminal when the beacon transmission signal S49a is "0," and selects an output signal of the detector circuit 46c which is output as the data transmission request signal S46f.

Radio Communication Method in First Embodiment

A radio communication method in the radio LSI 40 shown in FIG. 1 will be described separately for (1) transmission of normal data, (2) transmission of beacon data, and (3) data reception.

(1) Transmission of Normal Data:

During a normal data transmission, the beacon register 49a is set to "1" from the external MAC part 61 through the PHY I/F part 50, and this beacon transmission signal S49a set at "1" causes the input terminal of the selector 46f to switch to the "0" side. A data transmission command (PD_DATA.request) is sent from the external MAC part 61 to the PHY I/F part 50 of the radio LSI 40 in synchronism with a serial transfer clock CK, and transmission data from the external MAC part 61 is parallelly transferred to the RAM 44 through the PHY I/F part 50 and bus 45 and stored therein. As the transmission data is stored in the RAM 44 from the PHY I/F part 50, the PHY I/F part 50 outputs the pulsed RAM data transmission request signal S50 which is applied to the wrapper 46.

In the wrapper 46, the RAM data transmission request signal S50 is detected by and held in the detector circuit 46c which outputs a signal at "H" level which is selected by the selector 46. Then, the selector 46 outputs the data transmission request signal S46 at "H" level. The wrapper 46 reads data stored in the RAM 44 in response to the data transmission request signal S46 in accordance with a data transfer path set by the register 49. The read data is encrypted in the security part 48, and then parallelly transferred to the PHY part 47. Otherwise, the data in the RAM 44 is parallelly transferred to the PHY part 47. As the data in the RAM 44 is transferred to the PHY part 47, the pulsed data transmission completion signal S46d is output from the data transmission completion signal generator circuit 46d to clear the detector circuit 46c.

The PHY part 47, when in a transmission state, temporarily holds the read data received thereby in an internal buffer, converts the data to data in the ZigBee format, and serially transfers the converted data to the modem part 43. The modem part 43 modulates the data to generate transmission data which is serially transferred to the RF part 42, and is transmitted from the antenna 41.

ZigBee commands include a request signal (Request) and a confirmation signal (Confirm). Upon transmission of data, a PD_DATA.request command is sent from the MAC part 61 to the PHY I/F part 50 as transmission data. In response, a PHY transmission result is responded through PD_DATA.Confirm. The response indicates, through the confirmation signal (Confirm), such contents as a successful transmission (Success), a PHY reception state (RX_ON), a PHY stop state (TRX_OFF), and Buffer_full. In the foregoing case, the PHY part 47 has transferred data to the modem part 43, so that PHY part 47 responds by sending a successful transmission (Success) to the external MAC part 61 as the confirmation signal (Confirm).

On the other hand, when the PHY part 47 is not in the transmission state (reception state (RX_ON), stop state (TRX_OFF), or Buffer_full state), no data is transmitted through the model part 43 and RF part 42, but the PHY part 47 notifies the external MAC part 61 of a transfer unavailable state as the confirmation signal (Confirm). In this way, the MAC part 61 re-transmits transmission data as required, thereby satisfying the ZigBee standard.

(2) Transmission of Beacon Data:

FIG. 6 is a timing chart showing a communication method in a beacon data transmission of FIGS. 5A, 5B.

FIG. 6 shows an example in which the PHY part 47 is in a transmission state. H1 in the figure represents a data transmission section by the PHY part 47, indicating that a transfer has been completed before a beacon interval BI signal. H2 represents a transmission data transfer section from the RAM 44 to the PHY part 47, and H3 represents a time from the beacon interval BI signal to the completion of a data transfer to the PHY part 47.

During a beacon data transmission, the beacon register 49a is set to "1" from the external MAC part 61 through the PHY I/F part 50, and this beacon transmission signal S49a set at "1" causes the selector 46f to switch the input terminal to the "1" side. Beacon data sent from the external MAC part 61 is parallelly transferred from the PHY I/F part 50 to the RAM 44 through the bus 45, and stored in the RAM 44. As the beacon data is stored in the RAM 44, the PHY I/F part 50 outputs the pulsed RAM data transmission request signal S50 which is applied to the wrapper 46.

In the wrapper 46, the pulsed RAM data transmission request signal S50 is detected by and held in the detector circuit 46c which outputs a signal at "H" level and applies this signal to the AND gate 46e. As the beacon interval BI expires, causing the pulsed beacon interval BI signal S47 to be output from the timer 47a through an internal interrupt, and the PHY transmission state transition signal S47 to transition to "H" level, indicating that the PHY part 47 is in a transmission state, the beacon interval BI signal S47a is detected by and held in the detector circuit 46b. The detector circuit 46b outputs a signal at "H" level which is applied to the AND gate 46e. The PHY transmission state transition signal S47 at "H" level is detected by and held in the detector circuit 46a. The detector circuit 46a outputs a signal at "H" level which is applied to the AND gate 46e. This causes the AND gate 46e to output a signal at "H" level, which is selected by the selector 46f, to output the data transmission request signal S46f at "H" level.

The wrapper 46 reads data stored in the RAM 44 in response to the data transmission request signal S46f in accordance with a data transfer path set by the register 49. The read data is encrypted in the security part 48, and then parallelly transferred to the PHY part 47. Otherwise, the data in the RAM 44 is parallelly transferred to the PHY part 47. As the data in the RAM 44 is transferred to the PHY part 47, the pulsed data transmission completion signal S46d is output from the data transmission completion signal generator circuit 46d to clear the detector circuits 47b, 46c and beacon register 49a.

Since the PHY part 47 is in a transmission state, it temporarily holds the beacon data received thereby in the internal buffer, converts the data to data in the ZigBee format, and serially transfers the converted data to the modem part 43. The modem part 43 modulates the beacon data which is then serially transferred to the RF part 42, and is transmitted from the antenna 41. Then, the PHY part 47 responds to the external MAC part 61 by transmitting the confirmation signal (Confirm) indicative of successful transmission.

Figure 4:
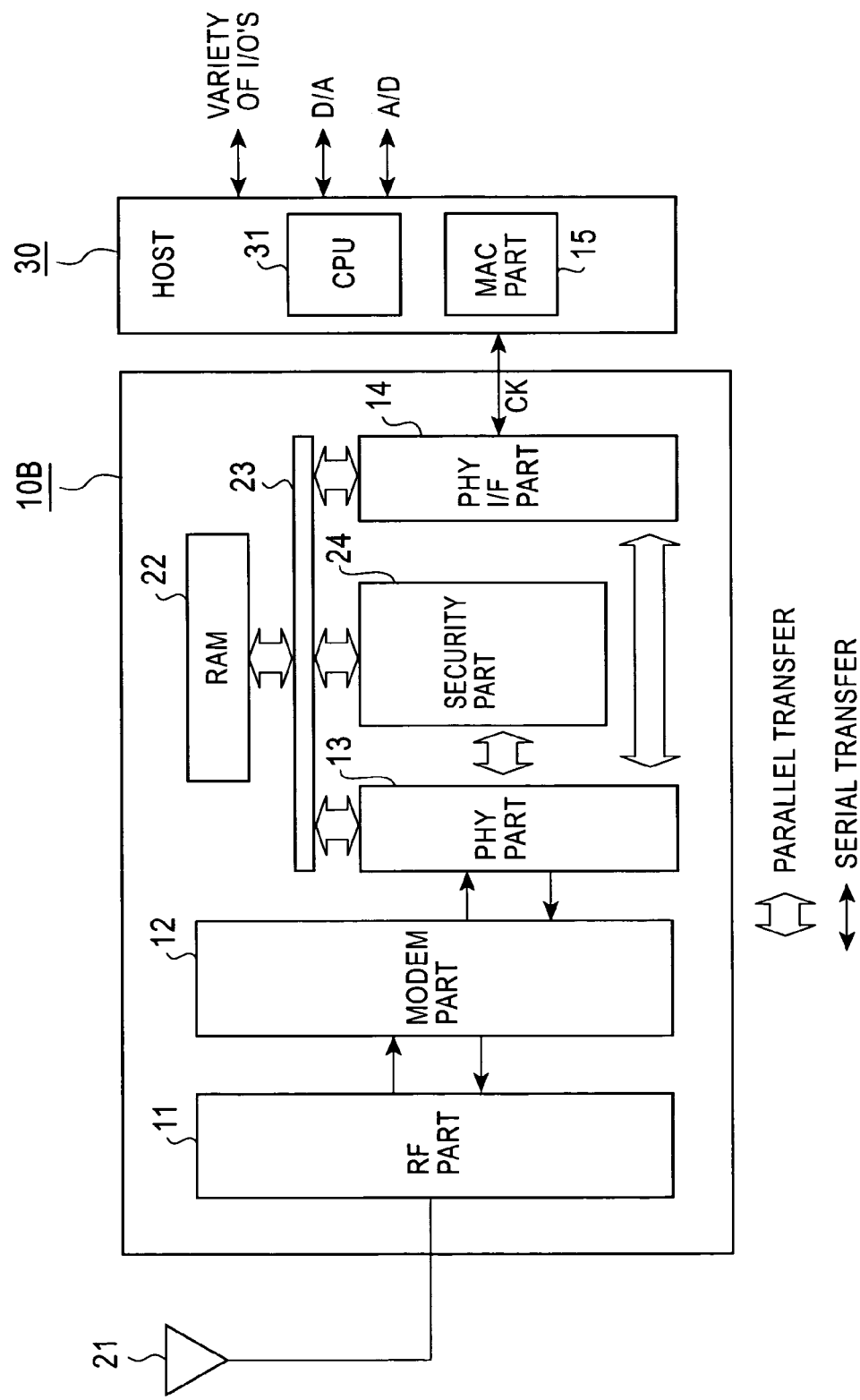
FIG. 4 is a functional block diagram showing an exemplary circuit configuration of a conventional PHY-equipped radio LSI.

Since the conventional radio LSI 10B shown in FIG. 4 is not provided with a beacon register, the beacon data is transferred through a path including the MAC part 15, PHY part 13, and RF part 11 as occasion demands (at the time the RAM transmission completion signal arrives) during transmission. Therefore, it appears that the beacon data is transmitted at the time the external MAC part 15 recognizes the expiration of the beacon interval BI. In this event, since the transfer is performed through a serial I/F such as SCI, the beacon data is transmitted with a significant delay from the actual beacon interval BI. For preventing this delay, it is contemplated that a timer contained in the external MAC part 15 previously calculates a time at which the beacon interval BI arrives, such that the beacon data is transmitted beforehand. However, since the beacon data has a variable length with the maximum length being, for example, 127 bytes, it is not feasible to change a time at which the beacon data is transferred beforehand from one time to another because this involves a complicated control. Also, when a transfer is not successful (when the PHY part 13 is not in a transmission state), the MAC part 15 is notified of a failure response. While no problem arises in the specifications of ZigBee if the MAC 15 re-transmits the beacon data as required, the beacon interval BI must be observed when the beacon data is transmitted, so that a delayed beacon interval BI would cause a failure in establishing the synchronization with a communication partner, thus resulting in difficulties.

To solve the foregoing problem, the first embodiment provides a circuit configuration which completes the transmission of beacon data without fail at the time the beacon interval BI arrives. Specifically, by setting the beacon register 49a to "1," the RAM data transmission request signal S50 goes to "H" level at the time the beacon data is stored in the RAM 44, but the selector 46f is prevented from outputting the data transmission request signal S46f at "H" level until the beacon interval BI signal S47a and PHY transmission state transition signal S47 go to "H" level.

In this way, in the method of communicating the beacon data over the air in the first embodiment, the arrival of the beacon interval BI can be recognized through an internal interrupt (beacon interval BI signal S47a) which informs that the beacon interval BI has arrived, but another significant feature is the use of the PHY transmission state transition signal S47 which informs at the start of a data transfer from the RAM 44 that the PHY part 47 has transitioned to a transmission state. As a function of the PHY-equipped radio LSI 40, if the PHY part 47 is not in the transmission state when transmission data is transmitted (transferred from the MAC part 61), the data cannot actually be transmitted if the PHY part 47 is not in the transmission state. This result is responded to the MAC part 61 as the confirmation signal (Confirm). Therefore, with the use of the PHY transmission state transition signal S47 which informs that the PHY part 47 has transitioned to the transmission state, it is possible to eliminate a failure in transmitting transmission data (responding other than Success as Confirm), ensuring that the beacon interval BI is observed in the data transmission.

(3) Data Reception:

Normal data or beacon data received by the antenna 41 and RF part 42 is serially transferred, demodulated by the modem part 43, and serially transferred to the PHY part 47. The serially transferred reception data, after converted to data in a predetermined format by the PHY part 47 and temporarily stored in the internal buffer, is parallelly transferred from the PHY part 47 through the wrapper 46 and bus 45, and stored in the RAM 44, or is parallelly transferred from the PHY I/F part 50 to the security part 48 for decryption, and parallelly transferred through the wrapper 46 and bus 45 for storage in the RAM 44, in accordance with a transfer path set by the register part 49. The reception data read from the RAM 44 is parallelly transferred to the PHY I/F part 50 through the bus 45, and serially transferred from this PHY I/F part 50 to the MAC part 61 of the host 30.

Effects of First Embodiment

The first embodiment has the following effects (A)-(C).

(A) The first embodiment employs the selector 46f which is switched by the beacon transmission signal S49a output from the beacon register 49a, to switch the data transmission request signal S46f for transmitting data from the RAM 44 to the PHY part 47, such that a transfer is started at the time the data transmission request signal S46f goes to "1." In this way, for transmitting the beacon data, the beacon data has been previously transferred to the RAM 44, such that the beacon data is transmitted during the beacon transmission interval BI and when the PHY part 47 is in the transmission state, thus making it possible to maintain the beacon interval BI, and moreover prevent a failure in the transmission of transfer data due to the state of the PHY part 47. Afterward, the beacon register 49a is cleared to "0" by the data transmission completion signal S46d upon completion of the transmission of the beacon data, and the selector 46f is switched to the "0" side, so that data can be subsequently transmitted in a normal state.

(B) FIG. 7 is a diagram showing a shift in the beacon interval BI during a transmission of the beacon data in FIGS. 5A, 5B.

FIG. 7 shows an example in which a first data period (for example, a super-frame duration) SD is set to 15.36 millisec, and the beacon interval BI is set to 30.72 millisec in the super-frame structure. H4 in the figure represents a section in which data is transferred with the beacon register 49b set to "1."

The storage of the beacon data in the RAM 44 can be supported by doing so at the start of a second data period (for example, Inactive) of the super-frame structure. However, the beacon interval BI may be set to the same value as the super-frame duration SD. In this event, another interrupt is generated by the timer 47a before the interrupt triggered by the beacon interval BI time, and a notification is made in response to this interrupt that it is the time the beacon setting is required. The external MAC part 61 sets the beacon transmission signal to "H" level in response to the interrupt, and stores the beacon data in the RAM 44, thereby supporting the storage of the beacon data.

(C) FIG. 8 is a timing chart showing a communication method during the transmission of the beacon data when either the beacon register 49a or selector 46f is not provided as is the case in the prior art.

FIG. 8 shows an example in which the PHY part 47 is in a transmission state. H11 in the figure represents a data transfer section associated with the PHY part 47; H12 represents a transmission data transfer section from the RAM 44 to the PHY part 47 in a normal state; and H13 represents a time from the beacon interval BI signal to the completion of the data transfer to the PHY part 47.

In the absence of the beacon register 49a and selector 46f as those in the first embodiment, during the transmission of the beacon data, the AND gate 46e outputs the data transmission request signal (S46f) at "H" level at the time all the output signals of the detector circuits 46a, 46b, 46c go to "H" level, and the beacon data stored in the RAM 44 is transferred to the PHY part 47. Since the transfer section H12 is delayed from the transfer section H2 in FIG. 6, the time H13 required from the beacon interval signal to the completion of the data transfer to the PHY part 47 is longer than the time H3 in FIG. 6.

Figure 9:
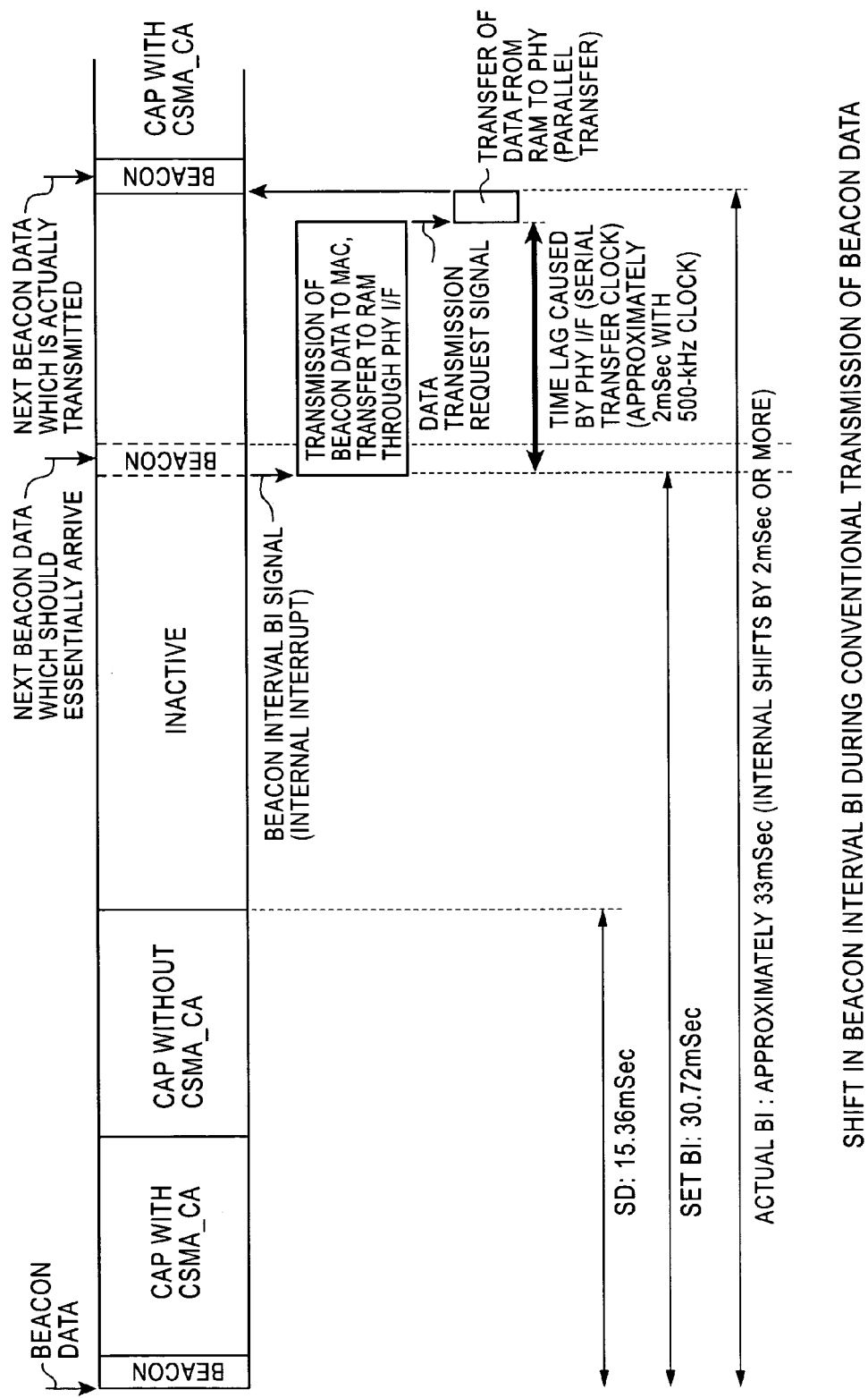
FIG. 9 is a diagram showing a shift in the beacon interval BI during beacon data transmission when either the beacon register 49a or selector 46f is not provided as is the case in the prior art.

FIG. 9 is a diagram corresponding to FIG. 7, showing a shift in the beacon interval BI during the transmission of the beacon data when either the beacon register 49a or selector 46f is not provided as is the case in the prior art.

FIG. 9 shows an example in which the super-frame duration SD is set to 15.36 millisec, and the beacon interval BI is set to 30.72 millisec in the super-frame structure.

After the start of Inactive in the super-frame structure, the beacon interval BI signal is output, followed by the transmission of the beacon data from the MAC part 61, storage of the beacon data in the RAM 44 through the PHY I/F part 50, and the data transmission request signal (Sf46f) at "H" level output from the AND gate 46e. In this section from the output of the beacon interval BI signal to the output of the data transmission request signal (S46f), a time lag occurs due to the PHY I/F part 50 which operates with the serial transfer clock CK (for example, approximately 2 millisec with a 500-KHz clock). As the data transmission request signal (S46f) at "H" level is output, the beacon data stored in the RAM 44 is parallelly transferred to the PHY part 47. Therefore, the actual beacon interval BI is approximately 3 millisec, resulting in a shift of the interval by 2 millisec or longer.

On the other hand, in the first embodiment, the RAM data transmission request signal S50 is output at the start of Inactive, and the beacon data is transmitted from the MAC part 61, and stored in the RAM 44 through the PHY I/F part 50, as shown in FIG. 7. Subsequently, the beacon interval BI signal is output, the data transmission request signal S46f at "H" level is output from the selector 46f, and the beacon data stored in the RAM 44 is parallelly transferred to the PHY part 47. This transfer time is approximately several μsec because it is a parallel transfer internal to the LSI. Thus, the actual beacon interval BI is approximately 30.72 millisec, and a shift in the beacon interval BI is small enough, as compared with FIG. 9, to fall within an allowable range. In this way, data can be communicated while the beacon interval BI is maintained.

The present invention is not limited to the first embodiment described above, but can be modified in various manners. A second embodiment, which is an exemplary modification, may be configured, for example, in the following (a) to (c):

(a) Since FIG. 5A shows a functional block, the PHY part 47, security part 48, and register part 49 may be disposed, for example, within the wrapper 46, or a variety of circuits may be added to the radio LSI 40, including a clock control function, a received wave strength measuring function, a test circuit for confirming the characteristics of RF, and the like.

(b) Since the security part 48 in FIG. 5A is an optional function, it may not be provided if not needed.

(c) The present invention can also be applied to other control circuits and radio communication methods when data is transmitted while the beacon interval BI is maintained in the PHY 1.

This application is based on Japanese Patent Application No. 2005-049451 which is hereby incorporated by reference.

What is claimed is:

1. A radio integrated circuit adapted to be compliant with ZigBee specification, comprising:

a radio transmission/reception part for converting modulated data to radio waves and transmitting the radio waves during a transmission, and receiving incoming radio waves to output reception data during a reception in accordance with IEEE 802.15.4_radio communication standard;

a modulator/demodulator part for modulating converted data to modulated data and outputting the modulated data to said radio transmission/reception part during the transmission, and demodulating the reception data and outputting demodulated data during the reception;

a physical layer part for outputting a transmission state transition signal and converting transfer data to the converted data in a predetermined format, and outputting the converted data to said modulator/demodulator part during the transmission, and capturing the demodulated data in a reception state;

a time measuring part for outputting a beacon interval signal when a beacon interval expires;

a storage part for storing the demodulated data captured by said physical layer part, normal transmission data sent from a media access control layer part disposed outside, or beacon data sent from said media access control layer part;

a physical layer interface part for transmitting/receiving data between said media access control layer part and said physical layer part in synchronism with a serial transfer clock, transmitting the demodulated data stored in said storage part to said media access control layer, and outputting a storage part data transmission request signal when the normal transmission data sent from said media access control part or the beacon data is received and stored in said storage part; and a transfer part for controlling a transfer of data between said physical layer part and said storage part, wherein a beacon flag is provided which is set by said media access control layer part to a first logic when the normal transmission data is transmitted, and to a second logic when the beacon data is transmitted, and said transfer part comprises a selector for selecting the storage part data transfer request signal when the beacon flag is at the first logic to transfer the normal transmission data stored in the storage part to said physical layer part, and selecting the result of a logical AND of the transmission state transition signal, the beacon interval signal, and the storage part data transmission request signal when the beacon flag is at the second logic to transfer the beacon data stored in said storage part to said physical layer part.

2. A radio integrated circuit according to claim 1, further comprising:

a security part for encrypting or decrypting the data transferred between said physical layer part and said transfer part such that said security part can be inserted or disconnected based on a predetermined set value.

3. A radio integrated circuit according to claim 1, wherein:
said switching circuit includes:
a first latch circuit for latching the transmission state transition signal;
a second latch circuit for latching the beacon interval signal;
a third latch circuit for latching the storage part data transmission request signal;
a logic circuit for taking a logical AND of output signals of said first, second, and third latch circuits;
a selecting part for selecting the output signal of said third latch circuit when the beacon flag is at the first logic to transfer the normal transmission data stored in said storage part to said physical layer part, and selecting an output signal of said logical circuit when the beacon flag is at the second logic to transfer the beacon data stored in said storage part to said physical part; and
a clear circuit for clearing said second latch circuit, said third latch circuit, and said beacon flag in response to a transfer of the beacon data stored in said storage part to said physical layer part.

4. A radio integrated circuit according to claim 2, wherein:
said switching circuit includes:
a first latch circuit for latching the transmission state transition signal;
a second latch circuit for latching the beacon interval signal;
a third latch circuit for latching the storage part data transmission request signal;
a logic circuit for taking a logical AND of output signals of said first, second, and third latch circuits;
a selecting part for selecting the output signal of said third latch circuit when the beacon flag is at the first logic to transfer the normal transmission data stored in said storage part to said physical layer part, and selecting an output signal of said logical circuit when the beacon flag is at the second logic to transfer the beacon data stored in said storage part to said physical part; and
a clear circuit for clearing said second latch circuit, said third latch circuit, and said beacon flag in response to a transfer of the beacon data stored in said storage part to said physical layer part.

* * * * *